United States Patent Office 2,861,981
Patented Nov. 25, 1958

2,861,981

POLYESTERS AND ISOCYANATE REACTION PRODUCTS THEREOF

Charles E. Frank and Virgil L. Hansley, Cincinnati, Ohio, assignors to National Distillers and Chemical Corporation, New York, N. Y., a corporation of Virginia No Drawing. Application February 5, 1954
Serial No. 408,612

21 Claims. (Cl. 260—75)

This invention relates broadly to a novel class of synthetic ester products and to a process for their manufacture and, more particularly, it relates to a group of polyester compounds derived from heretofore unknown branched chain glycols. Still more particularly, it relates to polyesters which have been modified by further reaction with organic diisocyanates and other organic materials to yield elastomeric polymers.

It is an object of this invention to prepare a novel class of polyesters, including diesters in which the component glycol or mixtures of glycols have a branched structure.

It is another object of this invention to provide a convenient and efficient method by which diesters and polyesters can be prepared from organic acids and saturated branched chain glycols containing at least 8, and preferably 10, carbon atoms.

It is a further object to describe novel esters and polyesters and derivatives thereof, having highly useful properties and having great value in the field of synthetic rubbers, plasticizers, lubricants, various plastics, and resins, and the like.

Previous studies have shown that the properties of organic polyesters and the resultant utility of these materials in their many commercial applications are very dependent on the molecular structures of the glycol and acid components. In the past, the only readily available glycols have been those prepared from olefins having relatively low molecular weight and in which the hydroxyl groups are on adjacent carbon atoms, or possibly those in which the carbons having the hydroxyl groups are separated by only one or two carbon atoms. However, higher molecular weight glycols, having the hydroxyl groups separated by more than one carbon atom, have been difficult to obtain and expensive to manufacture on a commercial scale, since they were generally made by reduction of esters of higher molecular weight dibasic acids.

Thus, the range of high molecular weight glycols readily available for preparing saturated polyesters has been limited to a marked degree.

Esters and polyesters derived from certain new glycols obtained by recently discovered methods can be prepared and these together with their derivatives, constitute the novel compositions of this invention.

The diesters and polyesters of this invention are formed by reaction of a carboxylic acid, preferably the dibasic acids having at least six carbon atoms per molecule with the saturated branched chain glycols of at least $C_8$ molecular weight. The esterification reaction proceeds with the elimination of water to yield a polyester.

As a result of the type and amounts of reactants used in their formation, the branched chain polyesters may contain active terminal groups which are either carboxyl or hydroxyl groups depending upon whether an acid or a glycol was the last compound to react in the formation of the molecule. These polyesters described herein may then be lengthened by controlled reaction between these active terminal groups and other reagents. Generally, the polyester is lengthened further by reaction between these hydrogen bearing terminal groups and a bifunctional material which is reactive with it, for instance, an organic diisocyanate. This reaction forms linkages between the diisocyanate groups and the terminal groups of the polyester and produces a chain extended polymer. In case there is a terminal hydroxyl group, this is a urethane linkage, and in the case of a terminal carboxyl linkage, it is an amide linkage. Both the urethane linkage and the amide linkage have available hydrogen atoms for reaction with an additional bifunctional material such as the diisocyanates and, by these steps, it is possible to cross-link the chain extended polymer at various points along its chain.

These modified polymers produced from the diesters and polyesters may be varied considerably in their physical properties depending upon the many variables in their preparation. For instance, they may be soft, waxy materials, elastomeric or rubbery materials, hard fiberforming materials, tough leathery materials, and hard, thermosetting resinous materials. These materials are subject to the various finishing reactions which are peculiar to their chemical and physical constitution. For example, the modified, rubbery interpolymers may be subjected to cross-linking and curing operations and will undergo processing, forming and molding in many ways similar to other elastomeric materials.

The branched chain diesters and polyesters which are in themselves new compounds are preferably made from saturated branched chain glycols having at least a total of $C_{10}$ carbon atoms. The terminal hydroxyl groups of the glycol are separated by at least six, and preferably eight, carbon atoms and there is at least one branch on said chain containing two carbon atoms.

The present invention is particularly concerned with di- and polyesters and ester derivatives of the following new saturated $C_8$, $C_{10}$, $C_{12}$ and $C_{14}$ glycols, their mixtures and mixtures containing them: 2-ethyl-1,8-octanediol, 3-ethyl-1,10-decanediol, 3,6-diethyl-1,8-octanediol, 4,7-diethyl-2,9-decanediol, 4-ethyl-2,11-dodecanediol, and 3,13-tetradecanediol.

As acids there may be used substantially any aliphatic acid or diacid including acetic acid, propionic acid, butyric acids, valeric acids, pelargonic acid and higher monocarboxylic acids, malonic acid, succinic acid, adipic acid, methyl adipic acid, fumaric acid, maleic acid, malic acid, dihydromuconic acid, azelaic acid, sebacic acid, suberic acid, phthalic, terephthalic and isophthalic acids, and higher dicarboxylic acids.

Mixtures of various of the glycols and diacids can also be used, the products obtained being mixed polyesters.

The condensation of the selected glycols with the acids is done by heating the reactants together, preferably at 100–250° C. either with or without a reaction diluent. A slight excess of glycol insures that there are little or no acidic components remaining in the final polyesters. For relatively non-acidic products, the terminal groups will be predominantly alcoholic hydroxyl groups. The water by-product formed during the esterification reaction should be removed from the reacting mixture by distillation in order to insure completion of the esterification reaction.

The degree and state of polymerization of the polyesters may be conveniently determined by analysis for the average number of carboxyl and hydroxyl groups in a given amount of the polyester. The acid number is a measure of the number of terminal carboxyl groups, and the hydroxyl number is a measure of the number of terminal hydroxyl groups. The sum of the carboxyl and hydroxyl numbers is an indication of the average number of terminal groups present in the polyester product which, in turn, is an indication of the degree of polymerization.

These diesters and polyesters have outstanding properties for use either as above or in combinations as plasticizers, lubricants, and additives. Because of the presence of relatively long chain, branched glycol residues in the ester molecules, these compositions have properties which do not exist in other more linear types of esters. For instance, they are more compatible with resins of branched structure, they will have lower freezing points as lubricants and they will have lower brittle points and other good properties when used as polyester type resins.

If the products are to be converted into diisocyanate modified products, the polyesters must be obtained substantially anhydrous. This can be accomplished by heating or by introduction of inert gases or some inert drying agent. The polyesters preferred for further reaction such as with diisocyanates should have a hydroxyl number of from 20 to 100 and an acid number from 0 to 5.

For converting the polyesters into the diisocyanate modified products, the diisocyanates are preferably used in excess over the polyester terminal hydroxyl groups in the polyesters. Generally, an excess of 20 to 100% will be adequate. All kinds of diisocyanates can be used, including both aliphatic types such as hexamethylene diisocyanate, octamethylene diisocyanate, and decamethylene diisocyanate, and aromatic types such as naphthalene-1,5-diisocyanate, 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, and p-phenylene diisocyanate.

The elastomeric diisocyanate modified polyesters may be employed either in the cured or uncured states and for all kinds of uses where elasticity, resistance to chemicals, and resistance to swelling is desired. For example, they can be used for soles and heels, for shoes and boots, balls for golf, tennis, etc., packing materials, belts, hose, tires, gaskets, molded goods, floor mats, dipped goods, tank linings, covered rolls, and other mechanical and industrial goods.

It is also contemplated that the products obtained and identified as polyesters modified with diisocyanates can be reacted and modified further by interaction with other additives particularly bifunctional organic materials. It is possible to react these further modifying materials either simultaneously with, or subsequent to, the reaction of the polyesters with the diiosocyanates.

These bifunctional additives may be of the type that contain two groups each having an active, available hydrogen. The bivalent radical to which they are attached can be either aliphatic or aromatic. Compounds which are useful include diamines, dibasic carboxylic acids, amino acids, hydroxy acids, amino alcohols as well as certain ureas and substituted ureas. Diamines and diacids have been found to be particularly valuable.

In this case, a further cross-linking of the macromolecules and formation of a rubber-like state is effected since, in general, the amount of bifunctional additive used is below or only equal to the amount equivalent to the excess of isocyanate group in the polymers.

The branched chain, high molecular weight glycols which are used as components in the various novel compositions of this invention are readily made by initially treating an aliphatic conjugated diolefin with finely dispersed sodium or potassium in a selected liquid ether medium and in the presence of a relatively small amount of a polycyclic aromatic hydrocarbon and/or in the presence of a selected solid, friable attrition agent at controlled temperatures. This initial step is a reaction which yields a dimerized product of the starting diolefin. For example, if butadiene and sodium are used, the dimeric product comprises the disodium derivaitves of the aliphatic octadienes. This product is then converted to a glycol product or a mixture of glycol products. This may be done by treatment with either a carbonyl compound such as an aldehyde or ketone or an epoxide under selective conditions to yield ultimately glycol products which are subsequently hydrogenated to give saturated glycols. Generally, mixtures of isomeric glycol products are obtained.

For example, using the dimer derivative of butadiene and formaldehyde, a mixture of $C_{10}$ glycols is obtained including 2-ethyl-1,8-octanediol. Butadiene dimer and acetaldehyde ultimately yield an isomeric mixture of $C_{12}$ glycols and substitution of acetone or propionaldehyde for acetaldehyde gives $C_{14}$ glycols. The dimerized derivatives of butadiene and ethylene oxide also yield an isomeric $C_{12}$ mixture including 3,6-diethyl-1,8-octanediol and 3-ethyl-1,10-decanediol. Use of propylene oxide and butadiene dimer gives $C_{14}$ glycols including 4,7-diethyl-2,9-decanediol, 4-ethyl-2,11-dodecanediol, and 2,13-tetradecanediol. Other reactants yield higher isomeric glycol mixtures accordingly.

The invention will be described in greater detail by the following examples in which all parts are expressed by weight. It is not intended, however, to limit the invention specifically to the products and processes of these examples.

*Example 1*

A mixture of 2-ethyl-1,8-octanediol and sebacic acid in the ratio of 1.16 moles of glycol to 1 mole of acid was heated at 150° C. until 75% of the theoretical amount of water had been removed by distillation. Nitrogen was bubbled through the melt during this and subsequent heating operations. The temperature was slowly raised to 200° and the pressure gradually lowered to 20 mm. After 16 hours at this temperature, the pressure was lowered to under 0.5 mm. for one hour. When cooled, the resulting polyester product was semi-solid in nature and had acid and hydroxyl numbers of 0.55 and 28.2 respectively.

*Example 2*

A quantity of the polyester prepared according to Example 1 was heated in an open glass container to 120° C. Octamethylene diisocyanate (0.95 mole per mole of polyester) was stirred into the hot melt. After a mixing period of 15 minutes, the material was baked for 10 hours in an oven at 120° C. The resulting "ester rubber" displayed excellent processing characteristics on a rubber mill.

*Example 3*

Another interpolymer was prepared by the same procedure described under Example 2, except that chemical modification was accomplished by the addition of 1.10 moles of octamethylene diisocyanate per mole of polyester and 0.06 mole of sebacic acid per mole of polyester. The product displayed excellent processing characteristics on a rubber mill.

*Example 4*

Another interpolymer was prepared by the same procedure listed in Example 2, except that 1.10 moles of octamethylene diisocyanate and 0.06 mole of octamethylene diamine per mole of polyester were added to effect chemical modification. This product also displayed excellent processing characteristics on a rubber mill.

*Example 5*

A solution of 7 parts (0.05 mole) of 2-ethyl-1,8-octanediol in 70 parts of pyridine was treated with 30 parts of acetic anhydride at reflux temperature. The resulting mixture was cooled, poured into 225 parts of water, and extracted several times with chloroform. After distillation of the solvent, the residue was distilled under reduced pressure to yield 8.3 parts (81%) of 2-ethyl-1,8-octanediol diacetate, B. P. 112–114°/0.1 mm., $N_D^{25}$ 1.4369, $d_4^{25}$ 0.958, $MR_D$ (calcd.) 70.2, $MR_D$ (found)

70.7, Sap. eq. (calcd.) 129.2, Sap. eq. (found) 132.4. Similar esterifications with n-butyric and pelargonic acids gave viscous ester oils having excellent plasticizer and lubricant properties.

*Example 6*

Using the procedure described in Example 1, a polyester was prepared from sebacic acid and a mixture of $C_{10}$ glycols (4 parts decamethylene glycol, 5 parts 2-ethyl-1,8-octanediol, and 1 part 2,5-diethyl-1,6-hexanediol). The resulting polyester was found to have an acid number of 0.89 and an hydroxyl number of 37.4.

*Example 7*

A modified interpolymer was formed from the polyester described in Example 6 using the procedure described in Example 2 for modification of the polyester with octamethylene diisocyanate. The resulting modified interpolymer displayed excellent processing characteristics on a rubber mill.

*Example 8*

A mixed polyester was prepared as described in Example 1 from a mixture of $C_{12}$ glycols (4 parts 1,12-dodecanediol, 5 parts 3-ethyl-1,10-decanediol, 1 part 3,6-diethyl-1,8-octanediol) and adipic acid. The resultant polyester had a hydroxyl number of 48 and an acid number of 0.5. This product (350 parts) was mixed with 75 parts of 1,5-naphthalene diisocyanate and 25 parts of o-dichlorobenzidine. After thorough mixing, the liquid melt was introduced into a mold heated at 100° C. where the initial stage of the cure was accomplished in 30–40 minutes. The article then was removed from the mold and cured an additional 5–6 hours at 100° in an oven. The resultant finished product had tough, resilient properties similar to those of vulcanized rubber. Resistance to hydrocarbon solvents and to abrasion was superior to that of rubber.

*Example 9*

A mixture of saturated $C_{12}$ glycols containing 3-ethyl-1,10-decanediol, 3,6-diethyl-1,8-octanediol, and 1,12-dodecanediol and having a hydroxyl equivalent of 105.2 (420 parts) was heated with 280 parts of adipic acid with simultaneous removal of the water formed, until the polyester product showed a hydroxyl number of 42 and acid value of 3. The resultant new polyester can be reacted further with diisocyanate such as 4,4'-diphenyl diisocyanate or 1,5-naphthalene diisocyanate to yield a new type of "ester rubber."

*Example 10*

A mixture of saturated $C_{10}$ glycols containing 2-ethyl-1,8-octanediol, 2,5-diethyl-1,6-hexanediol and 1,10-decanediol having a hydroxyl equivalent of 91.2 (540 parts) was heated with 580 parts of sebacic acid while removing the water formed until the product showed a hydroxyl number of 51 and an acid value of 1. The resultant new polyester can be reacted with a diisocyanate to yield an ester rubber similar to the product obtained in Example 9.

*Example 11* n-Butyric acid (176 parts) was heated with 174 parts of 2-ethyl-1,8-octanediol while removing the water of reaction until esterification was complete. The resultant novel diester is of value as a synthetic lubricant and as a plasticizer.

What is claimed is:

1. An ester of an organic carboxylic acid and a saturated aliphatic glycol having only carbon atoms in the skeletal chain and having a total of from about eight to fourteen carbon atoms, at least one $C_2$ branch per molecule, and the terminal hydroxyl groups of which are separated by at least six carbon atoms.

2. A polyester of an organic dicarboxylic acid and a saturated aliphatic glycol having only carbon atoms in the skeletal chain and having from about ten to fourteen carbon atoms, at least one $C_2$ branch per molecule, and the terminal hydroxyl groups of which are separated by at least six carbon atoms.

3. A polyester according to that described in claim 2 in which the organic dicarboxylic acid has at least six carbon atoms.

4. An ester of an organic carboxylic acid with a mixture of saturated branched $C_{10}$ glycols having only carbon atoms in the skeletal chain, at least one $C_2$ branch per molecule and in which the terminal hydroxyl groups are separated by at least six carbon atoms.

5. An ester of an organic carboxylic acid with 2-ethyl-1,8-octanediol.

6. An ester of an organic carboxylic acid with a mixture of saturated branched $C_{12}$ glycols having only carbon atoms in the skeletal chain, at least one $C_2$ branch per molecule and in which the terminal hydroxyl groups are separated by at least eight carbon atoms.

7. An ester of an organic carboxylic acid with a mixture of saturated branched $C_{12}$ glycols having only carbon atoms in the skeletal chain and including 3-ethyl-1,10-decanediol and 3,6-diethyl-1,8-octanediol as major components.

8. An ester of an organic carboxylic acid with a mixture of saturated branched $C_{14}$ glycols having only carbon atoms in the skeletal chain, at least one $C_2$ branch per molecule, and in which the terminal hydroxyl groups are separated by at least six carbon atoms.

9. An ester of an organic carboxylic acid with a mixture of saturated $C_{14}$ glycols including 4,7-diethyl-2,9-decanediol, 4-ethyl-2,11-dodecanediol and 3,13-tetradecanediol as major components.

10. An elastomeric organic diisocyanate modified polyester of an organic dicarboxylic acid having at least six carbon atoms with a saturated, branched aliphatic glycol having only carbon atoms in the skeletal chain and having from about ten to fourteen carbon atoms, at least one $C_2$ branch per molecule, and the terminal hydroxyl groups of which are separated by at least six carbon atoms.

11. A modified polyester according to claim 10 in which said glycol is a saturated, branched $C_{10}$ glycol.

12. A modified polyester according to claim 10 in which said glycol is a saturated, branched $C_{12}$ glycol.

13. A modified polyester according to claim 10 in which said glycol is a mixture of saturated, branched $C_{12}$ glycols.

14. A modified polyester according to claim 10 in which said glycol is a mixture of saturated, branched $C_{14}$ glycols.

15. A modified elastomeric product from a polyester of an organic dicarboxylic acid having at least six carbon atoms with a saturated, branched aliphatic glycol having only carbon atoms in the skeletal chain and having from about ten to fourteen carbon atoms modified with an organic diisocyanate and an organic bifunctional compound selected from the groups consisting of diamines, dibasic carboxylic acids, amino acids, hydroxy acids, amino alcohols, said glycol being further characterized in that it contains at least one $C_2$ branch per molecule and the terminal hydroxyl groups of which are separated by at least six carbon atoms.

16. An elastomeric product according to that described in claim 15 in which said glycol is a saturated, branched $C_{10}$ glycol.

17. An elastomeric product according to that described in claim 15 in which said glycol is a saturated, branched $C_{12}$ glycol.

18. An elastomeric product according to that described in claim 15 in which said glycol is a saturated, branched $C_{14}$ glycol.

19. An ester of an organic carboxylic acid and a saturated branched chain glycol having only carbon atoms in the skeletal chain and having from about eight to fourteen carbon atoms, the terminal hydroxyl groups of which are separated by at least six carbon atoms, and in which each branched chain in the glycol consists of a C$_2$ branch.

20. An ester product, as defined in claim 19, wherein the glycol contains a plurality of C$_2$ branches.

21. A product as defined in claim 19, wherein the acid is an organic dicarboxylic acid.

References Cited in the file of this patent

UNITED STATES PATENTS

| | | |
|---|---|---|
| 2,585,827 | Padbury et al. | Feb. 12, 1952 |
| 2,599,468 | McKeever | June 3, 1952 |
| 2,621,166 | Schmidt et al. | Dec. 9, 1952 |
| 2,625,532 | Seeger | Jan. 13, 1953 |
| 2,729,618 | Muller | Jan. 3, 1956 |
| 2,757,210 | Jenner | July 31, 1956 |
| 2,773,092 | Carley et al | Dec. 4, 1956 |

FOREIGN PATENTS

| | | |
|---|---|---|
| 644,287 | Great Britain | Oct. 11, 1950 |